(12) United States Patent
Rosengard

(10) Patent No.: US 7,596,560 B2
(45) Date of Patent: Sep. 29, 2009

(54) SYSTEM AND METHOD FOR ADAPTIVE QUERY IDENTIFICATION AND ACCELERATION

(75) Inventor: Phillip I. Rosengard, Sterling, VA (US)

(73) Assignee: Raytheon Company, Waltham, MA (US)

( * ) Notice: Subject to any disclaimer, the term of this patent is extended or adjusted under 35 U.S.C. 154(b) by 116 days.

(21) Appl. No.: 11/021,687

(22) Filed: Dec. 23, 2004

(65) Prior Publication Data

US 2006/0155697 A1 Jul. 13, 2006

(51) Int. Cl.
*G06F 7/00* (2006.01)
*G06F 17/30* (2006.01)

(52) U.S. Cl. .................... 707/7; 707/2; 707/6
(58) Field of Classification Search ........... 707/1–10, 707/100–104.1, 200–206
See application file for complete search history.

(56) References Cited

U.S. PATENT DOCUMENTS

| | | | | |
|---|---|---|---|---|
| 5,412,806 | A * | 5/1995 | Du et al. ............ | 707/2 |
| 5,619,692 | A | 4/1997 | Malkemus | |
| 6,023,695 | A * | 2/2000 | Osborn et al. ........ | 707/3 |
| 6,023,696 | A * | 2/2000 | Osborn et al. ........ | 707/3 |
| 6,026,391 | A | 2/2000 | Osborn et al. | |
| 6,466,931 | B1 | 10/2002 | Attaluri et al. | |
| 6,938,035 | B2 * | 8/2005 | Driesch et al. ....... | 707/3 |
| 2003/0172059 | A1 | 9/2003 | Andrei | |
| 2004/0158551 | A1 | 8/2004 | Santosuosso | |

OTHER PUBLICATIONS

Kaushik et al., Evaluating refined queries in top-k retrieval systems, Feb. 2004, IEEE, vol. 16, 256-270.*
El Zanfaly et al., Modeling and analysis of a multi-level caching database system, Dec. 27-30, 2003, IEEE, vol. 3, 1604-1607.*
PCT/US2005/046984 International Search Report dated May 26, 2006.

* cited by examiner

*Primary Examiner*—Jean B. Fleurantin
(74) *Attorney, Agent, or Firm*—Daly, Crowley, Mofford & Durkee, LLP

(57) ABSTRACT

A data management system and method. The system is adapted to analyze a plurality of data queries and provide a metric with respect thereto. The system then orders the queries based on the metric to improve a performance parameter of the system or estimate an execution time with respect to the query. In a more specific implementation, the system includes code for analyzing a signature of each of the queries, comparing the signature to a calibrated signature and providing a signature score in response thereto. The system further includes code for estimating an execution time of at least one of the queries. The signature may be a cluster of statements in an appropriate language such as SQL (standard query language). As an alternative, the signature may be a set of features extracted from a plurality of statements.

14 Claims, 4 Drawing Sheets

SYSTEM AND METHOD FOR ADAPTIVE QUERY IDENTIFICATION AND ACCELERATION

BACKGROUND OF THE INVENTION

1. Field of the Invention

The present invention relates to computers and computer software. More specifically, the present invention relates to database management systems and methods.

2. Description of the Related Art

Commercial off the shelf (COTS) database software engine cache management systems generally utilize LRU (Least Recently Used) and other database cache management techniques that attempt to maximize actively accessed data references in a database cache. These conventional database caching algorithms generally have no knowledge of the next query and its data references. As such, conventional database cache management algorithms are generally sub-optimal with respect to query throughput.

Efforts to improve query throughput have included increases in the size of cache. However, this approach is limited by the amount of overhead (locks, latches and pointers) associated with data in cache. This overhead limits the speed of a central processing unit in a retrieval of the data.

Hence, a need exists in the art for a system or method for an improved database retrieval and cache management scheme to reduce the execution time per query and thereby improve overall throughput on a given hardware/software platform.

SUMMARY OF THE INVENTION

The need in the art is addressed by the data management system and method of the present invention. In a most general sense, the system is adapted to analyze a plurality of data queries and provide a metric with respect thereto. The system then orders the queries based on the metric to improve a performance parameter of the system or estimate an execution time with respect to the query.

In a more specific implementation, the system includes code for analyzing a signature of each of the queries, comparing the signature to a calibrated signature and providing a signature score in response thereto. The system further includes code for estimating an execution time of at least one of the queries. The signature may be a cluster of statements in an appropriate language such as SQL (standard query language). As an alternative, the signature maybe a set of features extracted from a plurality of statements.

User queries are optimally sequenced to maximize database cache hits prior to submission of the query to a conventional commercial off-the-shelf (COTS) database engine. To achieve optimal sequencing, each user query is identified for its similarity to other queued queries, in a data reference and SQL language sense, and the predicted execution time thereof. The predicted execution time can be used to filter queries that exceed a database cache window size.

Query identification is based upon the generation of query signatures. A query signature has two major components: data references and SQL statements. The signatures are generated using a single pass, beginning to end, parsing of the SQL query into data references and statements. Data reference aliases (i.e., those references with different symbolic names) and data constants are filtered from the data reference signature, as they have no bearing on database cache hits or misses. The query data references then are entered as elements into an n-vector space. The 'n' vector space is created using the database schema (contains all table and table element symbolic names and is COTS database engine independent) put in lexicographic order. The n-vector space is the data reference signature component used for query similarity identification. As an n-vector, many standard mathematical techniques can be used to measure similarity: Euclidean distance, Boolean, covariance, cross-correlation, etc.

Query SQL statement signatures can be generated using an ordered set of statements. An ordered statement set consists of the list of SQL statements, functions, or conditional operators, generated by the beginning to end query parser. The list then becomes the SQL statement signature component and can be compared to other queries using cross-correlation.

Using the data reference and SQL statement signatures (from the query identification process), queries queued for the database engine can be re-sequenced based on similarity from most similar to least similar. Thus, statistically, more cache hits should be generated over time than a random sequence of queries (since a random sequence will de-correlate the hit/miss ratio to some mean, while an ordered set will tend to increase the nit/miss ratio above the mean). Further, queries that exceed the database cache window (measured in windows) can be grouped for batch operation based on similarity, thus optimizing database cache hits.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
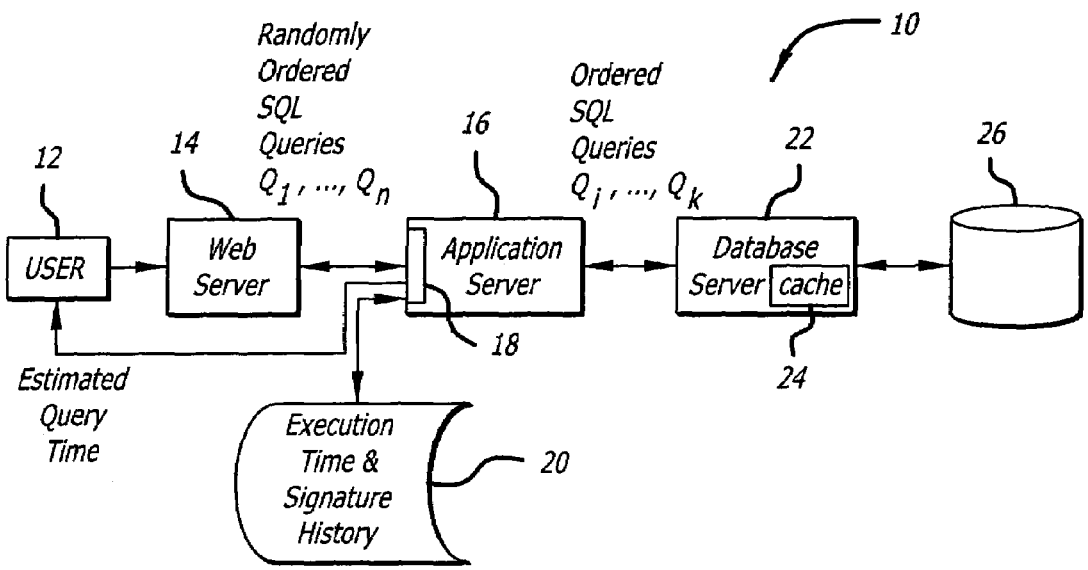
FIG. 1 is a simplified block diagram of an illustrative implementation of a data management system in accordance with the teachings of the present invention.

FIG. 1 is a simplified block diagram of an illustrative implementation of a data management system in accordance with the teachings of the present invention. As shown in FIG. 1, in the illustrative embodiment, the data management system 10 of the present invention includes a user interface 12, a web server 14, an application server 16, a database server 22 and a database 26. Typically, the database 26 is stored on a fixed medium such as a hard disk. In accordance with conventional teachings, the database server 22 has cache memory 24. The user interface 12, web server 14, application server 16, and database server 22 are implemented in software adapted to run on the central processing unit (CPU) of a general purpose computer (not shown). In accordance with the present teachings, the application server 16 is shown with a process 18 which optimizes the performance of the system 10 and outputs query execution time as discussed more fully below. Query signature and execution times are recorded by process 18 in storage 20. In accordance with the present teachings, performance optimization and query execution time are effected in software on the CPU via periodic query metrics and real time query time estimation and acceleration.

Figure 2B:
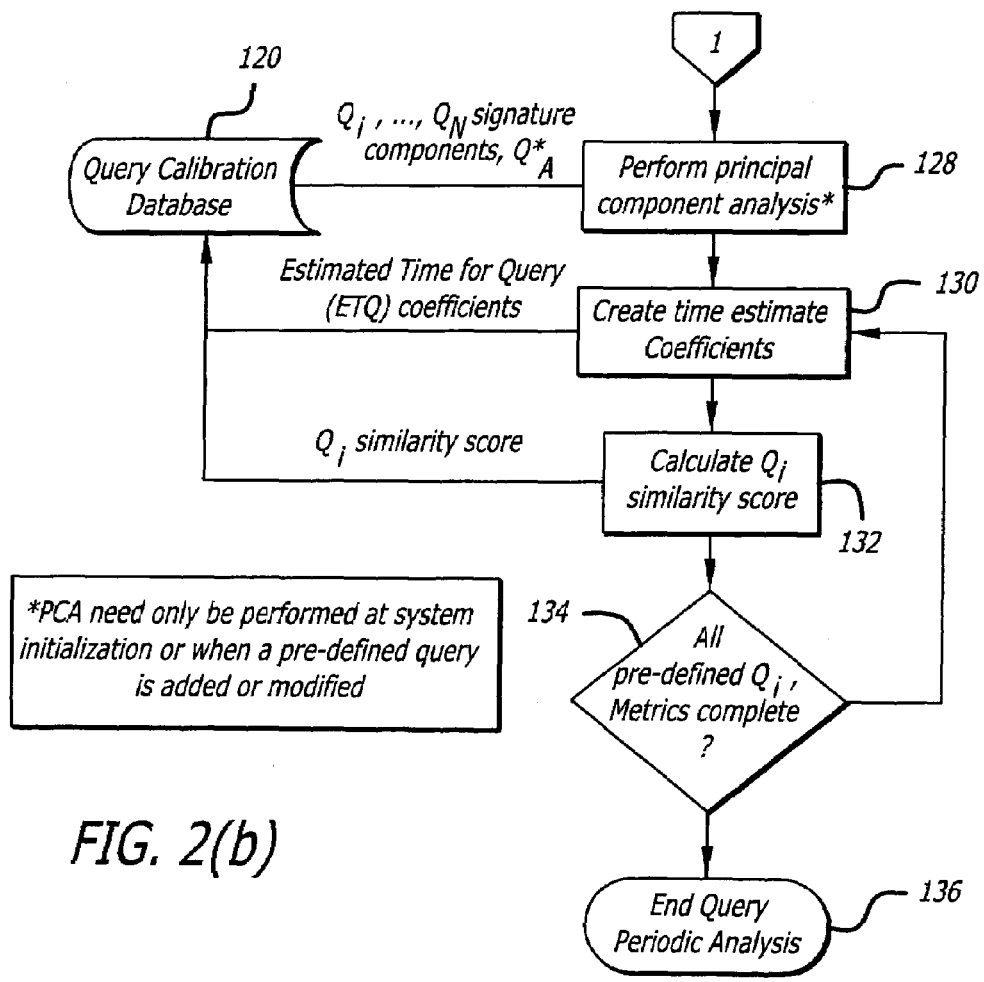
FIG. 2 is a flow diagram of an illustrative implementation of a periodic query metric method in accordance with the teachings of the present invention.
Figure 2A:
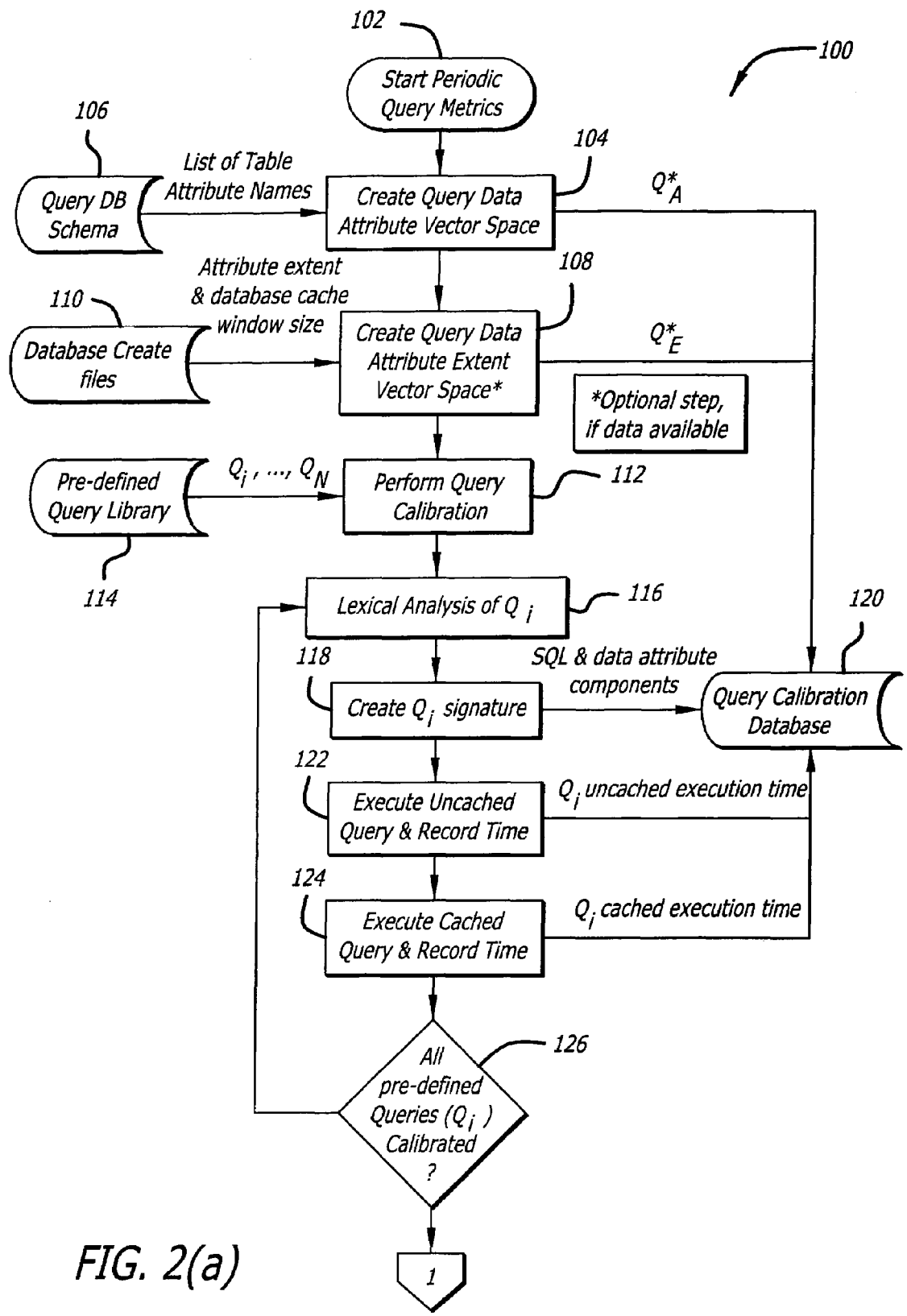

FIG. 2 is a flow diagram of an illustrative implementation of a periodic query metric method in accordance with the teachings of the present invention. As shown in FIG. 2(a) the method 100 includes the steps of initialization (102) and creating a query data attribute vector space (104). At step 106, database schema is queried to ascertain a list of table attribute names. The step 104 provides an ordered vector space of data attributes, e.g., lexicographic ordering of all data attribute names to form an ordered space $Q^*_A$ of dimension 1×N, where 'N' is the number of data attributes in the data base schema.

Next, at step 108, if data is available, the method 100 optionally creates a query data attribute extent vector space $Q^*_E$ using attribute extent and database cache window size data supplied by a step 110 of creating database files. The query data attribute extent vector space $Q^*_E$ is the extent of all data attributes in the ordered vector space of data attributes ($Q^*_A$) expressed as a 1×N vector with each vector element containing the extent (length) of the data attribute. The ordered vector space of data attributes $Q^*_A$ and the query data attribute extent vector space $Q^*_E$ are fed to a query calibration database 120.

At step 112, query calibration is performed using randomly ordered queries $Q_1 \ldots Q_N$ in a suitable language, such as SQL (Standard Query Language), provided from a pre-defined query library. Where 'N' is the number of queries in the library. Each query is executed, its' run time recorded; and its' signature generated as described in the following steps.

Next, at step 116, a lexical analysis of each procedural query $Q_i$ is performed. This analysis is performed by first creating a signature for each query ($Q_i$, where 'i' ranges from 1 to N) and outputting SQL and data attribute components to the query calibration database 120. As discussed more fully below, each $Q_i$ signature is a set of lexically extracted SQL and data attribute components formed as key features using principal component analysis (PCA).

Next, at step 122, each query $Q_i$ is executed without using cache and the uncached execution time is recorded and stored in the query calibration database 120. The uncached execution time is the query execution time when none of the data attributes are present in the database engine cache.

Then, at step 124, each query $Q_i$ is retrieved using cache and the cached execution time is stored in the query calibration database 120. The cached execution time is the query execution time when referenced data attributes are present in the database engine cache. Per step 126, this process is repeated for all N queries.

Next, as illustrated in FIG. 2(b), at step 128, a principal component analysis is performed using the signature components and the ordered vector space of data attributes $Q^*_A$ from the query calibration database 120. PCA involves an ordinal based feature extraction and classification of SQL query lexical structure and referenced data attributes. This step need only be performed at system initialization or when a pre-defined query is added or modified. Pre-defined queries are calibrated at system initialization or re-calibrated when modified to adapt to SQL, data attribute reference, or COTS data base engine or operating system changes.

At step 130, time estimate coefficients are created and ETQ (estimated time for query) coefficients are stored in the query calibration database 120. The ETQ coefficients are used in a linear or non-linear time estimate model to predict execution time of a query based on lexical SQL and data attribute features.

Next, at step 132 a similarity score is calculated for each query $Q_i$. The similarity score is a measure of the similarity between $Q_i$ and all other queries. If, at step 134, all pre-defined metrics are complete the periodic query analysis is ended at 136.

Figure 3A:
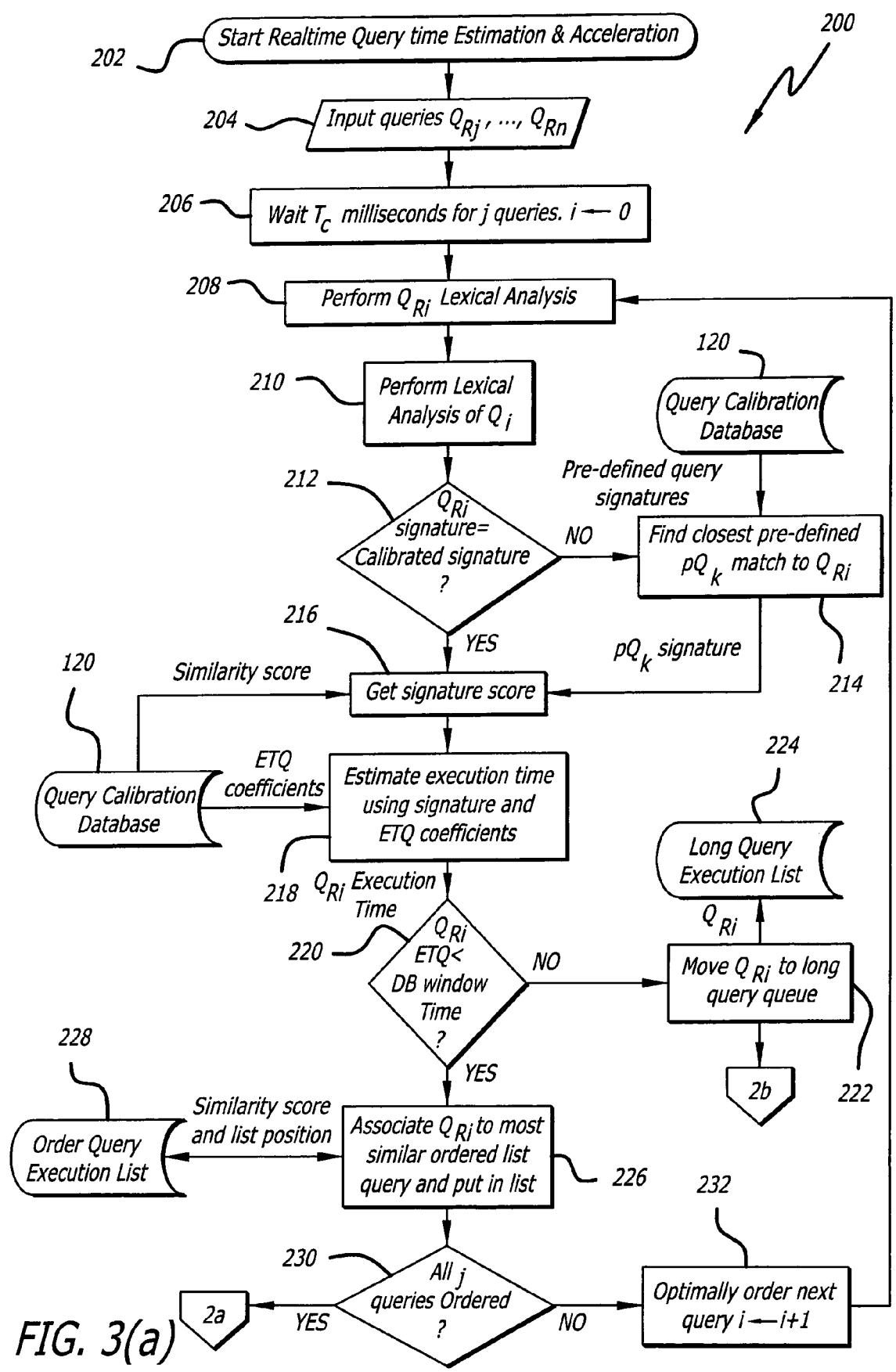
FIG. 3 is a flow diagram of an illustrative implementation of a real time query time estimation and acceleration method in accordance with the teachings of the present invention.
Figure 3B:
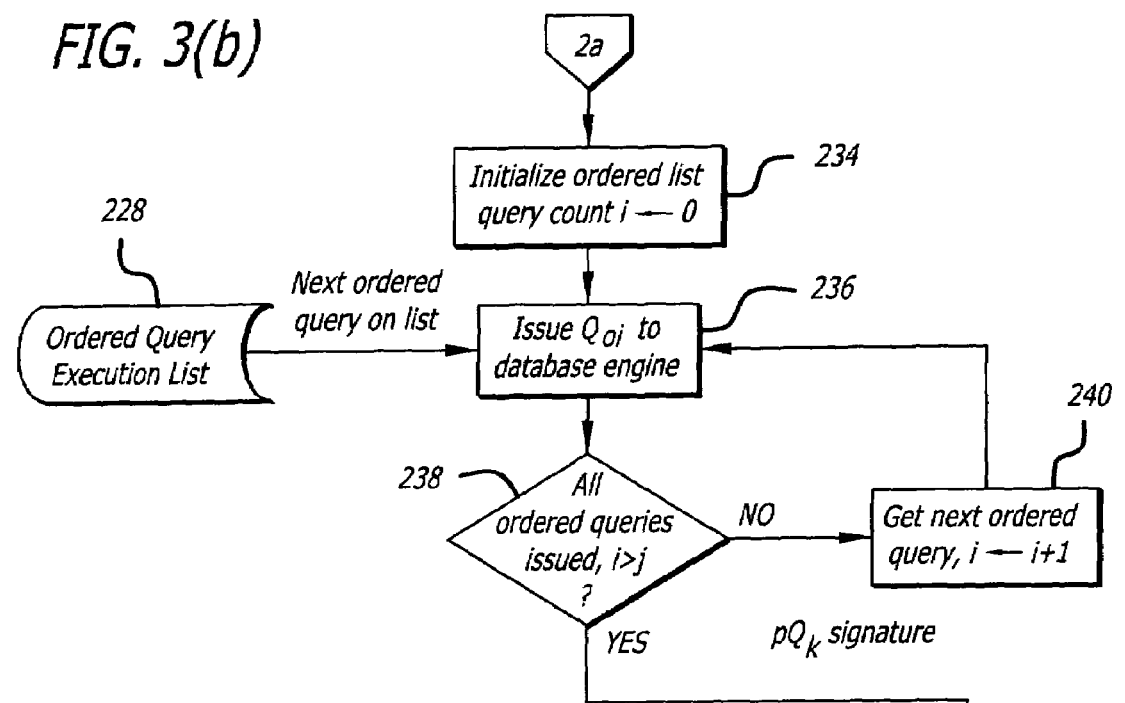
Figure 3B:
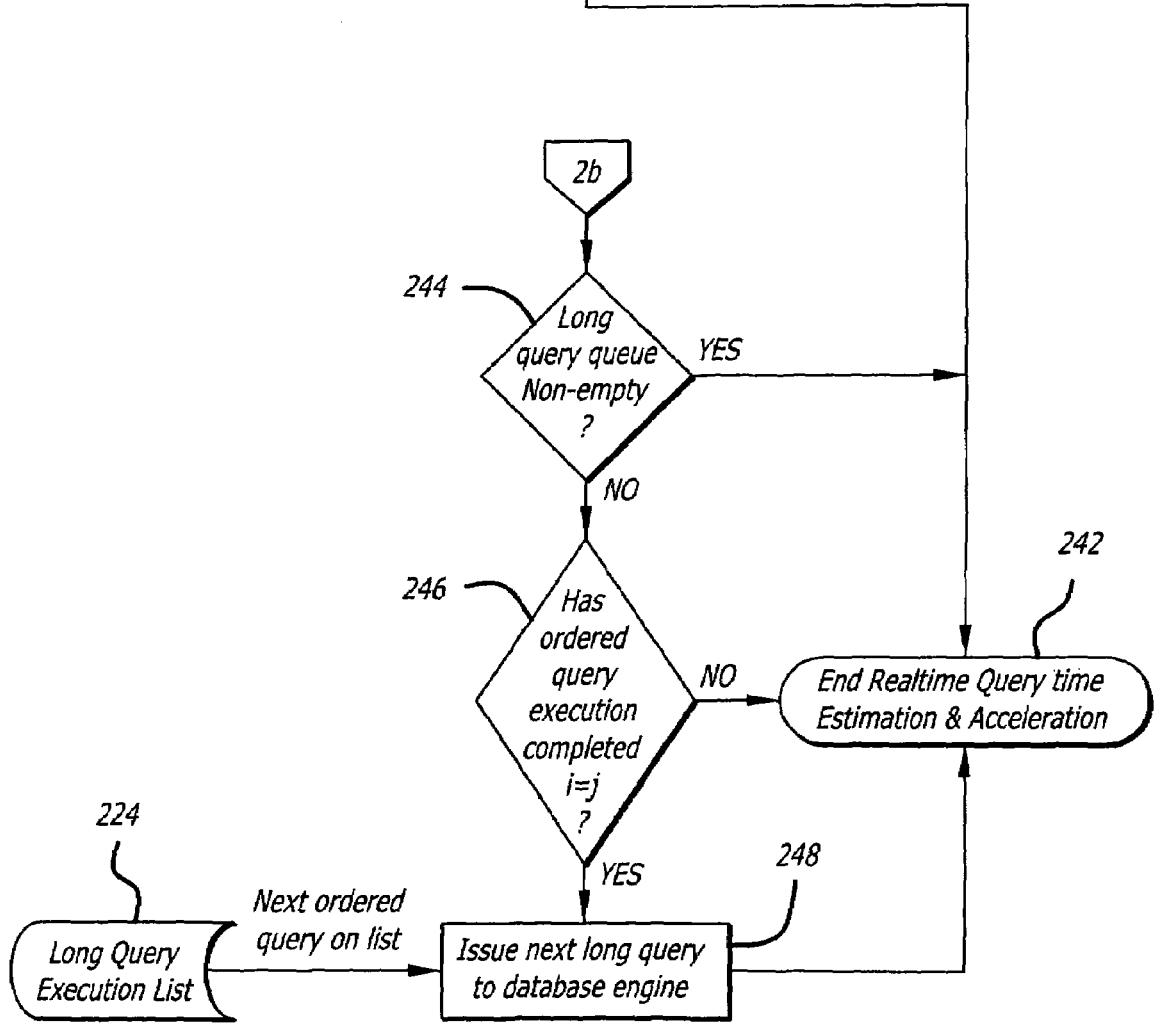

FIG. 3 is a flow diagram of an illustrative implementation of a real time query time estimation and acceleration method in accordance with the teachings of the present invention. The real time query time estimation and acceleration method 200 includes an initialization step 202 and a step 204 at which real time input queries $Q_{Rj}, \ldots, Q_{RN}$ are received.

Next, at step 206, the system waits $T_c$ milliseconds for 'j' queries where 'j' is the total number of queries collected, and 'i' is the 0 to j index of collected real-time queries. '$T_c$ milliseconds' is the time allocated to collect queries from a FIFO input queue of randomly sequenced queries and where 'j' queries are collected in $T_c$ milliseconds.

Then, at step 208, a lexical analysis is performed on each real time query $Q_{Ri}$. At step 212, each real time query signature $Q_{Ri}$ is compared to each calibrated signature. If each real time query signature $Q_{Ri}$ is equal to each calibrated signature, then, at step 216, the signature score is obtained from the query calibration database 120. If not, then at step 214, pre-defined query signatures are obtained from the query calibration database 120 and the closest pre-defined $pQ_K$ match to $Q_{Ri}$, where $pQ_K$ is $k^{th}$ member of the pre-defined queries in the query calibration data base. In any case, at step 216, the signature score is obtained from the query calibration database 120.

At step 218, the execution time is estimated using signature and ETQ coefficients from the query calibration database 120. The closest query calibration data base signature score to $Q_{Ri}$ is defines a unique pre-defined query, $pQ_K$, the signature and ETQ coefficients of $pQ_K$ are used for $Q_R$ in further processing. Then, at step 220, the system ascertains whether the estimated time for each real time query $Q_{Ri}$ is less than the data base cache window time. The data base cache window time is is usually measured in minutes and is a function of two computer parameters: (1) allocated main memory, and (2) secondary (disk) storage access time. If so, then, at step 226, each real time query is associated to a most similarly ordered list query and put in the list using a similarity score and list position information supplied by an ordered query execution list 228. If at step 230 all the queries are not ordered, then at step 232, 'i' is indexed and the next query is optimally ordered and the system returns to step 208 to perform another lexical analysis on the subject query.

If all the 'j' queries are ordered, then at step 234 an ordered list query count is initialized. See FIG. 3(b). At steps 236, 238 and 240, each ordered query '$Q_{oi}$' is issued to the database engine from the ordered query execution list 228 and the routine 200 ends at step 242.

If estimated time for each real time query $Q_{Ri}$ is not less than the data base cache window time, then each real time query is moved to a long query queue at steps 222 and 224 (FIG. 3(a)) and the system check the long query queue for a non-empty state at step 244 in FIG. 3(b). If the queue is not empty, then the routine 200 ends at step 242.

If the long query queue is found empty at step 244, then at step 246 the routine 200 checks for whether the ordered query execution has completed, i.e., i=j. If so, at step 248 the next long query from the long query execution list 224 is issued to the database engine and the routine 200 ends at step 242. If not, then the routine 200 ends at step 242.

In the illustrative embodiment, the present invention applies system identification techniques, such as feature extraction and cluster analysis, to SQL queries, correlates the query signature to execution time, and uses the query signature as an input to a control system to adaptively and intelligently sequence queries to maximize database cache performance. For example, if:

$$\text{Query Queue} = \{Q_1, Q_2, Q_3, Q_4\}, \quad [1]$$

Where query data parameters for $Q_1$ and $Q_4$ are similar ($Q_1 \sim Q_4$), then $Q_1, Q_4, Q_2, Q_3$ is a more database cache efficient sequence with respect to execution time.

In this application, a feature is a cluster or feature set extraction of SQL statements. For example:

$$\text{Sig } Q_1 = \{d_{11}, \ldots, d_{1i}\} \text{ data references and } \{s_{11}, \ldots, s_{1j}\} \text{ SQL statements} \quad [2]$$

$$\text{Sig } Q_2 = \{d_{21}, \ldots, d_{2k}\} \text{ data references and } \{s_{21}, \ldots, s_{2l}\} \text{ SQL statements} \quad [3]$$

They can be quickly and easily compared using standard mathematical techniques, e.g., cross-correlation.

$$|Sig(Q1) \cap \{Sig(Q1), Sig(Q2) \ldots, Sig(Qn)\}| = v1 \quad [4]$$

$$|Sig(Q2) \cap \{Sig(Q1), Sig(Q2) \ldots, Sig(Qn)\}| = v2 \quad [5]$$

where 'v1' is a signature vector for Q1 and 'v2' is a signature vector for Q2

An approach to generate these vectors with data reference feature set extraction is set forth below. Consider the following as a feature extracted sample SQL data set:

$$S_d = \{\text{sdo\_gid, sdo\_x1, sdo\_y1, cities\_sdogeom, a.sdo} \\ \text{hd —gid gid1, cities\_sdoindex a, window\_sdoindex b, b.sdo\_gid, [area of interest id],} \\ \text{a.sdo\_code, b.sdo\_code, sdo\_gid, gid1, sdo\_x1,} \\ \text{Xmin, Xmax, sdo\_y1, Ymin, Ymax}\} \quad [6]$$

It should be noted that:

1. One may want to filter out constant data references as these references are not cached.
2. SQL uses symbol overloading, for more concise expressions one may need to substitute the real data reference for the overloaded symbol prior to classification algorithm.
3. One may want to filter out multiple data references to shorten the feature set to only unique references.
4. One may want to keep multiple data references to develop "histogram" for median and mode analysis.

This is illustrated below:

Feature Extraction with Pre-Processing Step 1 Applied—Delete Constants $$S_d = \{\text{sdo\_gid, sdo\_x1, sdo\_y1, cities\_sdogeom, ,a.sdo\_gid gid1, cities\_sdoindex a, window\_sdoindex b, b.sdo\_gid, a.sdo\_code, b.sdo\_code,} \\ \text{sdo\_gid, gid1, sdo\_x1, sdo\_y1}\} \quad [7]$$

Feature Extraction with Pre-Processing Step 2 Applied—Delete Symbol Name Overload $$S_d = \{\text{sdo\_gid, sdo\_x1, sdo\_y1, cities\_sdogeom, cities\_sdogeom.sdo\_gid gid1, window\_sdoindex .sdo\_gid, cities\_sdoindex .sdo\_code, window\_sdoindex.sdo\_code, sdo\_gid, gid1, sdo\_x1,} \\ \text{sdo\_y1}\} \quad [8]$$

Feature Extraction with Pre-Processing Step 3 Applied—Eliminate Multiple References $$S_d = \{\text{sdo\_gid, sdo\_x1, sdo\_y1, cities\_sdogeom, cities\_sdogeom.sdo\_gid gid1, window\_sdoindex. sdo\_gid, cities\_sdoindex.sdo\_code, window\_sdoindex, sdo\_code}\} \quad [9]$$

Next, data set vectors are created. In the illustrative embodiment, general approaches are considered:

(1) Ordered set across data reference space: Data reference space is created by lexicographically ordering all the data attribute names in the data base schema. The order of the space, "N", is determined by the total number of data attribute names.

Once the data reference space has been created two variants may be used to create a data attribute signature vector:

(a) Count only unique data reference instances
(b) Count multiple data reference instances The next step in the feature extraction process is to take the SQL key features and group them by principal component for time estimation and signatures (e.g., number of JOIN, or other, statements; depth of statement nesting, etc.)

$$S_d = \{\text{sdo\_gid, sdo\_x1, sdo\_y1, cities\_sdogeom, cities\_sdogeom.sdo\_gid gid1, window\_sdoindex. sdo\_gid, cities\_sdoindex.sdo\_code, window\_sdoindex.sdo\_code}\} \quad [10]$$

$$S_d = \{\text{sdo\_gid, sdo\_x1, sdo\_y1, cities\_sdogeon, cities\_sdogeon.sdo}_{13} \text{ gid gid1, window\_sdoindex. sdo\_gid, cities\_sdoindex.sdo\_code, window\_sdoindex.sdo\_code, sdo\_gid, gid1, sdo\_x1, sdo\_y1}\} \quad [11]$$

II. Table I illustrates the data attributes found by lexical analysis of SQL procedure Sd. Table II illustrates a "complete" data reference space when the data base schema is used. Table I data attributes are a subset of Table II. Table II also illustrates how SQL procedure Sd uses elements of the data reference space.

TABLE I

| Dynamic Space | Unique | Multiple |
| --- | --- | --- |
| cities_sdogeom | 1 | 1 |
| cities_sdogeom.sdo_gid | 1 | 1 |
| cities_sdoindex.sdo_code | 1 | 1 |
| gid1 | 1 | 2 |
| sdo_gid | 1 | 1 |
| sdo_x1 | 1 | 2 |
| sdo_y1 | 1 | 2 |
| window_sdoindex.sdo_code | 1 | 1 |
| window_sdoindex.sdo_gid | 1 | 1 |

TABLE II

| Schema Space | Unique | Multiple |
| --- | --- | --- |
| a_variable | 0 | 0 |
| b_variable | 0 | 0 |
| c_variable | 0 | 0 |
| cities_sdogeom | 1 | 1 |
| cities_sdogeom.sdo_gid | 1 | 1 |
| cities_sdoindex.sdo_code | 1 | 1 |
| gid1 | 1 | 2 |
| sdo_gid | 1 | 1 |
| sdo_x1 | 1 | 2 |
| sdo_y1 | 1 | 2 |
| window_sdoindex.sdo_code | 1 | 1 |
| window_sdoindex.sdo_gid | 1 | 1 |
| x_variable | 0 | 0 |
| y_variable | 0 | 0 |
| z_variable | 0 | 0 |

Data reference space comparison for the signature data reference vector can use approaches including:
1. Mean vector and variance-covariance matrix
2. Cross-correlation of data histogram
3. Cross-correlation of ordered vectors
4. Euclidean distance measures—"dot" product SQL Procedure Classification:

In accordance with the present teachings, SQL (non-data) program is classified with a light weight computational approach. For example, a single pass lexical parser with no reliance on intermediate format SQL for program classification may be used.

Table III shows an illustrative set of standard SQL statements, functions and operators:

TABLE III

| # | SQL Statement |
|---|---|
| 1 | SELECT |
| 2 | DISTINCT |
| 3 | WHERE |
| 4 | AND OR |
| 5 | IN |
| 6 | BETWEEN |
| 7 | LIKE |
| 8 | ORDER BY |
| 9 | ASC |
| 10 | DESC |
| 11 | Functions |
| 12 | AVG |
| 13 | COUNT |
| 14 | MAX |
| 15 | MIN |
| 16 | SUM |
| 17 | COUNT |
| 18 | GROUP BY |
| 19 | HAVING |
| 20 | ALIAS |
| 21 | JOIN |
| 22 | OUTER JOIN |
| 23 | Subquery |
| 24 | UNION |
| 25 | UNION ALL |
| 26 | INTERSECT |
| 27 | MINUS |
| 28 | Comparison Operators |
| 29 | = |
| 30 | > |
| 31 | < |
| 32 | >= |
| 33 | <= |

The following is an illustrative SQL classification procedure:

```
SELECT sdo_gid, sdo_x1, sdo_y1
FROM cities_sdogeom,
     (SELECT a.sdo_gid gid1
      FROM cities_sdoindex a,
           window_sdoindex b
      WHERE b.sdo_gid = [area of interest id]
        AND a.sdo_code = b.sdo_code)
      WHERE sdo_gid = gid1
        AND sdo_x1 BETWEEN Xmin AND Xmax
        AND sdo_y1 BETWEEN Ymin AND Ymax;
```

Table IV shows another single pass lexical analyzer approach to SQL classification with the creation of a statement list in order encountered (right side of table) and an ordered vector for statements (left side of table); both of these can be used as SQL statement signature vectors for principal component extraction:

TABLE IV

| # | SQL Statement Single Pass Parse | SQL Vector | SQL Statement | Value |
|---|---|---|---|---|
| 1 | SELECT | | SELECT | 2 |
| 2 | FROM | | DISTINCT | 0 |
| 3 | SELECT | | WHERE | 2 |
| 4 | FROM | | AND | 4 |
| 5 | WHERE | | OR | 0 |
| 6 | = | | IN | 0 |
| 7 | AND | | BETWEEN | 2 |
| 8 | WHERE | | LIKE | 0 |
| 9 | = | | ORDER BY | 0 |
| 10 | AND | | ASC | 0 |
| 11 | BETWEEN | | DESC | 0 |
| 12 | AND | | AVG | 0 |
| 13 | AND | | COUNT | 0 |
| 14 | BETWEEN | | MAX | 0 |
| 15 | AND | | MIN | 0 |
| | | | SUM | 0 |
| | | | COUNT | 0 |
| | | | GROUP BY | 0 |
| | | | HAVING | 0 |
| | | | ALIAS | 0 |
| | | | JOIN | 0 |
| | | | OUTER JOIN | 0 |
| | | | UNION | 0 |
| | | | UNION ALL | 0 |
| | | | INTERSECT | 0 |
| | | | MINUS | 0 |
| | | | = | 2 |
| | | | > | 0 |
| | | | < | 0 |
| | | | >= | 0 |
| | | | <= | 0 |

In Table IV, 'value' shows frequency of statement occurrence. These values can be grouped into principal components as noted earlier for use in generation of ETQ model coefficients. Those skilled in the art will appreciate one can use a dot product, or histogram comparisons for correlation.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A computer-implemented data management system, comprising:
   an application server, including computer readable storage media comprising:
      software, when executed by a computer performs an operation of:
         collecting a plurality of realtime queries requiring execution;
      software, when executed by a computer performs an operation of:
         providing an ordered vector space of data attributes;
         providing, from available data, a query data attribute extent vector space;
         executing a plurality of predefined queries and providing a query signature for each query, each query signature including a data attribute component;
         executing each query of the plurality of predefined queries without using cache and recording an uncached execution time;
         executing each query of the plurality of predefined queries using cache and recording a cached execution time;

creating, for each query, a time estimate coefficient and estimated time for query coefficient;

calculating, for each query, a similarity score with respect to each other query; and providing metrics including the similarity score for each one of the plurality of predefined queries; and software, when executed by a computer performs an operation of:

ordering realtime queries based on said metrics of corresponding similar predefined queries to improve performance of said system.

2. The system of claim 1 wherein said signature is a cluster of statements.

3. The system of claim 2 wherein said statements are standard query language (SQL) statements.

4. The system of claim 1 wherein said signature is a set of features extracted from said data attribute component.

5. A computer readable storage media comprising:

software, when executed by a computer performs an operation of:

providing an ordered vector space of data attributes;

providing, from available data, a query data attribute extent vector space;

executing a plurality of predefined queries and providing a query signature for each query, each query signature including a data attribute component;

executing each query of the plurality of predefined queries without using cache and recording an uncached execution time;

executing each query of the plurality of predefined queries using cache and recording a cached execution time;

creating, for each query, a time estimate coefficient and estimated time for query coefficient; and calculating, for each query, a similarity score with respect to each other query.

6. The storage media of claim 5 wherein said query signature is a cluster of statements.

7. The storage media of claim 6 wherein said statements are standard query language (SQL) statements.

8. The storage media of claim 5 wherein said signature is a set of features extracted from said data attribute component.

9. A computer-implemented data management system, comprising:

computer-readable storage media comprising a database;

a processor coupled to said database;

a communications interface for supplying a plurality of queries to said database via said processor; and computer readable storage media including computer-readable instructions for execution by said processor for analyzing a plurality of said queries and organizing said queries to optimize a performance parameter with respect to a retrieval thereof and output results for the queries to a user; said computer-readable instructions when executed by a computer performs an operation of:

providing an ordered vector space of data attributes;

providing, from available data, a query data attribute extent vector space;

executing a plurality of predefined queries and providing a query signature for each query, each query signature including a data attribute component;

executing each query of the plurality of predefined queries without using cache and recording an uncached execution time;

executing each query of the plurality of predefined queries using cache and recording a cached execution time;

creating, for each query, a time estimate coefficient and estimated time for query coefficient;

calculating, for each query, a similarity score with respect to each other query; and providing metrics including the similarity score for each one of the plurality of predefined queries.

10. The system of claim 9 wherein said signature is a cluster of statements.

11. The system of claim 10 wherein said statements are standard query language (SQL) statements.

12. The system of claim 9 wherein said signature is a set of features extracted from said data attribute component.

13. The system of claim 9 further including software, when executed by a computer performs an operation of:

organizing said plurality of queries based on said metrics of similar corresponding predefined queries to improve performance of said system.

14. A data management method for implementing by a computer including computer-implemented steps of:

collecting a plurality of realtime queries requiring execution;

providing an ordered vector space of data attributes;

providing, from available data, a query data attribute extent vector space;

executing a plurality of predefined queries and providing a query signature for each query, each query signature including a data attribute component;

executing each query of the plurality of predefined queries without using cache and recording an uncached execution time;

executing each query of the plurality of predefined queries using cache and recording a cached execution time;

creating, for each query, a time estimate coefficient and estimated time for query coefficient; and calculating, for each query, a similarity score with respect to each other query;

providing metrics including the similarity score for each one of the plurality of predefined queries; and ordering the realtime queries based on said metrics associated with similar corresponding predefined queries; and outputting results of the realtime queries.

* * * * *